United States Patent [19]

Ohsugi et al.

[11] Patent Number: 4,980,442
[45] Date of Patent: Dec. 25, 1990

[54] VINYL POLYMER CONTAINING SILICONS AND PREPARATION THEREOF

[75] Inventors: Hiroharu Ohsugi; Yoshio Eguchi, both of Osaka; Satoshi Urano; Ryuzo Mizuguchi, both of Kyoto, all of Japan

[73] Assignee: Nippon Paint Co., Ltd., Osaka, Japan

[21] Appl. No.: 462,910

[22] Filed: Jan. 10, 1990

Related U.S. Application Data

[63] Continuation of Ser. No. 135,301, Dec. 21, 1987, abandoned.

[51] Int. Cl.$^5$ .............................................. C08G 77/04
[52] U.S. Cl. .......................................... 528/28; 528/32; 526/279; 556/418; 556/419; 556/421
[58] Field of Search ................. 556/418, 419, 421; 526/279, 28; 528/32

[56] References Cited

U.S. PATENT DOCUMENTS

| | | | |
|---|---|---|---|
| 4,307,240 | 12/1981 | Ching | 556/419 |
| 4,633,003 | 12/1986 | Falcetta et al. | 556/421 |
| 4,810,767 | 3/1989 | Furukawa et al. | 526/279 |

OTHER PUBLICATIONS

American Heritage Dictionary, 1982, Houghton Mifflin Co., Boston, p. 667.

*Primary Examiner*—Melvyn I. Marquis
*Attorney, Agent, or Firm*—Wenderoth, Lind & Ponack

[57] ABSTRACT

A novel class of silicon-containing vinyl polymers having in its molecule at least one constitutent unit of the formula

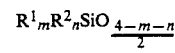

wherein $R^1$ is a substituted or unsubstituted monovalent hydrocarbon residue; $R^2$ is

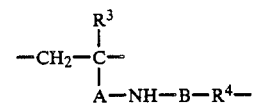

$R^3$ is hydrogen or methyl group; $R^4$ is a substituent directly bonded to silicon atom and is selected from a substituted or unsubstituted alkylene, or a substituted or unsubstituted alkylene containing hetero atoms; m and n each is a positive integer, which will fulfill the requirement of $2 \leq m+m \leq 4$; A is a direct bond,

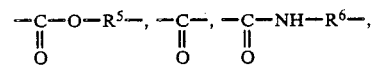

phenylene or substituted phenylene; B is

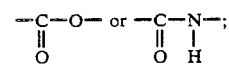

$R^5$ and $R^6$ each represents an alkylene, providing that when A is

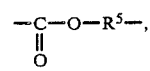

m+n is 2.

The present vinyl polymers are very useful in various technical fields including preparation of lens and other molding products, paints and various industrial resins.

5 Claims, No Drawings

VINYL POLYMER CONTAINING SILICONS AND PREPARATION THEREOF

This application is a continuation of now abandoned application, Ser. No. 07/135,301 filed on Dec. 21, 1987, now abandoned.

FIELD OF THE INVENTION

The present invention relates to a novel vinyl polymer containing silicone and preparation thereof.

BACKGROUND OF THE INVENTION

As a measure for imparting the characteristics possessed by a siloxane resin such as water resistance, weather resistance and the like to an acrylic resin or other resins, attempts have been made to fix an organosiloxane, through a chemical linkage, to a compound bearing radically polymerizable unsaturation bonds. For example, Japanese Patent Application Kokai No. 61126/79 discloses methyl di (trimethyl siloxy) silyl propyl glycerol methacrylate which is prepared by the addition reaction of organo polysiloxane containing epoxy groups and methacrylic acid and is used as a monomer for a resin which is excellent in oxygen permeability and hydrophilic properties and hence is useful as a contact lens material; Japanese Patent Application Kokai No. 63200/79 discloses an organo polysiloxane containing acryloyloxy groups which has the characteristic of being cured in a short period of time under irradiation condition and which is prepared by the reaction of organo polysiloxane containing amino groups and glycidyl acrylate; Japanese Patent Application Kokai No. 22325/81 discloses a process for the preparation of polymerizable organo polysiloxane by the reaction of organo polysiloxane containing epoxy groups and an acrylate; and Japanese Patent Application Kokai No. 180667/82 discloses a process for the preparation of polymerizable organosiloxane by the reaction of trialkyl chlorosilane and hydroxyalkyl acrylate. However, they are not always of satisfactory in respect to reaction speed and reaction yield and hence are not economical in an industrial scale production of silicon modified monomers. Furthermore, in these methods, since the principal objects are the mere introduction of hydrophobic siloxane bonds to polymerizable monomers, the actual use of thus obtained monomers has been rather limited to a narrow range as, for example, in the preparation of particular resins which are to be used in specific areas requiring the characteristic properties of said siloxane bonds only, as, the oxygen permeability of these resin making them useful in contact lens or the like. Under the circumstances, these present inventors, having endeavored to discover a novel class of polymerizable monomers containing silicons bearing functional groups or bonds and as well as siloxane bonds, have succeeded in establishing a method for the preparation of class of monomers represented by the formula:

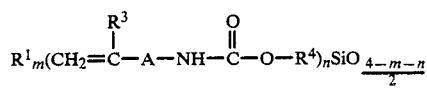

wherein $R^1$ is a substituted or unsubstituted monovalent hydrocarbon residue; $R^4$ is a substituent directly bonded to a silicon atom and is selected from a substituted or unsubstituted alkylene or a substituted or unsubstituted alkylene containing hetero atoms, the alkylene being attached directly to a silicon atom; $R^3$ is hydrogen or methyl group; A is a direct bond,

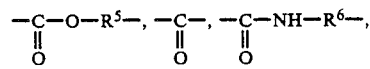

or a substituted or unsubstituted phenylene group; m and n each is a positive integer which will fulfil the requirement of $2 \leq m+n \leq 4$, comprising reacting a hydroxyl containing silicon compound of the formula:

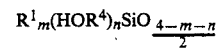

wherein $R^1$, $R^4$, m and n have the same meanings as defined hereinbefore, and a polymerizable isocyanate compound of the formula:

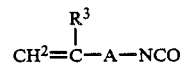

wherein $R^3$ and A have the same meanings as defined hereinbefore, and have applied for a patent on it at the same day with the present patent application (i.e. Japanese Patent Publication (unexamined) No. 298595/87). Such monomers may be homopolymerized or copolymerized with other vinyl monomers to provide various vinyl polymers containing silicons. It is, therefore, an object of the invention to provide a novel class of vinyl polymers containing silicons and bearing urethane bonds as well as siloxane bonds, which are derived from said polymerizable monomers containing silicons and are specifically useful in paints, optical lenses and other various industries. An additional object of the invention is to provide an advantageous method for the preparation of said vinyl polymers.

SUMMARY OF THE INVENTION

According to the invention, the above said objects can be attained with a vinyl polymer containing silicons having in its molecule at least one constituent unit of the formula (I):

wherein $R^1$ is a substituted or unsubstituted monovalent hydrocarbon residue; $R^2$ is;

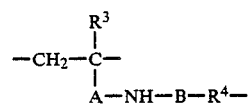

$R^3$ is hydrogen or a methyl group; $R^4$ is a substituent directly bonded to a silicon atom and is selected from a substituted or unsubstituted alkylene, or a substituted or unsubstituted alkylene containing hetero atoms; m and n each is a positive integer which will fulfil the requirement of $2 \leq m+n \leq 4$; A is a direct bond,

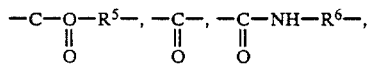

phenylene or a substituted phenylene; B is

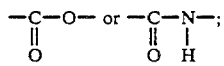

R$^4$ and R$^5$ each represents an alkylene, providing that when A represents

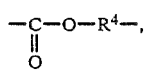

m+n is 2.

Preferred embodiments of the invention

The present silicon-containing vinyl polymers may be advantageously prepared by either one of the following methods.

That is, in the first method, a polymerizable monomer containing silicons represented by the formula (V):

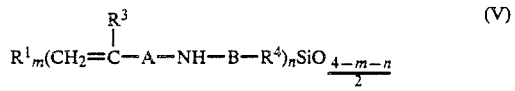

wherein R$^1$ is a substituted or unsubstituted monovalent hydrocarbon residue; R$^3$ is hydrogen or a methyl group; R$^4$ is a substituent directly bonded to a silicon atom and is selected from a substituted or unsubstituted alkylene or a substituted or unsubstituted alkylene containing hetero atoms; m and n each is a positive integer which will fulfil the requirement of $2 \leq m+n \leq 4$; A is a direct bond,

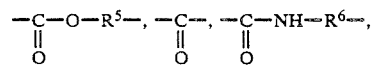

or a substituted or unsubstituted phenylene;

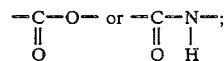

R$^5$ and R$^6$ each represents an alkylene, providing that when A is

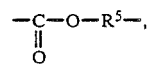

m+n is 2 is copolymerized with at least one other α, β-ethylenically unsaturated monomer. In the second method, a polymerizable isocyanate compound of the formula (VI):

wherein R$^3$ is hydrogen or a methyl group; A is a direct bond,

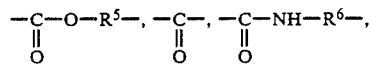

or a substituted or unsubstituted phenylene; R$^5$ and R$^6$ each represents an alkylene, and at least one other α, β-ethylenically unsaturated monomer bearing no functional groups reactive to said isocyanate group, are polymerized together and the thus obtained copolymer is then reacted with an organosilicon compound containing hydroxyl groups of the formula (VII):

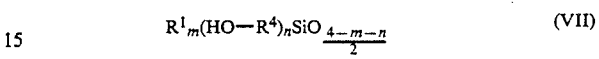

wherein R$^1$ is a substituted or unsubstituted monovalent hydrocarbon residue; R$^4$ is a substituent directly bonded to silicon atom and is selected from a substituted or unsubstituted alkylene or a substituted or unsubstituted alkylene containing hetero atoms; m and n each represents a positive integer which will fulfil the requirement of $2 \leq m+n \leq 4$, providing that when A of the aforesaid formula (VII) is

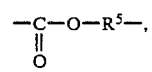

m+n is 2.

The polymerizable monomers containing silions of the formula (V) used in the preparation of the present vinyl polymers of the formula (I) are, as stated hereinbefore, novel compounds first prepared by the inventors by the reaction of organosilicon compounds containing hydroxyl groups of the formula (VII)

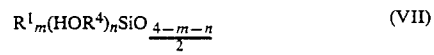

and polymerizable isocyanate compounds of the formula (VI)

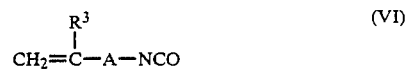

wherein R$^1$, R$^4$, m, n, R$^3$ and A each has the same meaning as defined hereinbefore. As the organosilicon compounds containing hydroxyl groups of the formula (VII), any of the linear or cyclic siloxanes or silanes having one and more silicon atoms may be satisfactorily used, providing they have at least one hydroxy alkyl group attached to silicon atoms. Preferable members are the compounds of the formula (VII) in which R$^1$ represents substituted or unsubstituted C$_1$ to C$_6$ alkyl or an alkenyl group and R$^4$ represents a substituted or unsubstituted lower alkylene or hetero atom containing lower alkylene group. More specifically, particularly preferable members are 1,3,5,7-tetramethyl-3,5,7-tripropyl-1-(γ-hydroxypropyl)-cyclotetrasiloxane, bis(trimethylsiloxy)-methyl-3-hydroxypropyl silane, 1,3,5,7-tetramethyl-3,7-dipropyl-1,5-bis(γ-hydroxypropyl) cyclotetrasiloxane, 1,1,3,3-tetramethyl-1,3-bis(γ-hydroxypropyl) disiloxane, 1,1,3,3,3-pentamethyl-1-(γ-hydroxypropyl) disiloxane, 1,1,3,3,3-pentamethyl-1-(γ-hydroxypropyl) disiloxane, tris(trimethylsiloxy)-γ-hydroxypropyl silane, 1,3,5,7-tetramethyl-3,5,7-tripropyl-1-(β-hydroxyethoxy)-propyl cyclotetra siloxane and the like.

Examples of isocyanate compounds having α,β-ethylenically unsaturated bonds represented by the formula (VI) are methacryloyl isocyanate, 2-isocyanate ethyl methacrylate, 2-isocyanate methyl methacrylate, 2-isocyanate ethyl acrylate, 2-isocyanate propyl methacrylate, 2-isocyanate octyl acrylate, p-isopropenyl-α,α-dimethyl benzyl isocyanate, m-isopropenyl-α,α-dimethyl benzyl isocyanate, p-ethylenyl-α,α-dimethyl benzyl isocyanate, m-ethylenyl-α, α-dimethyl benzyl isocyanate, vinyl isocyanate and the like. Particularly preferable members from the standpoint of higher reactivity toward an active hydrogen bearing group is methacryloyl isocyanate.

The aforesaid compound (VII) and compound (VI) are generally reacted in an equimolar ratio of the hydroxyl group in said compound (VII): isocyanate group in said compound (VI). When a highly reactive isocyanate compound is selected, the urethane reaction can be carried out very quickly without using a catalyst and at a room temperature, and however, when a less reactive isocyanate compound is used, an appropriate catalyst such as dibutyl tin dilaurate is usually employed and the reaction may be advantageously carried out at an elevated temperature, e.g. 70° to 110° C., for 2 to 4 hours. In either case, the reaction yield is excellent. The said polymerizable monomers containing silicons may also be prepared by the combination steps of reacting an organosilicon compound containing hydroxyl groups of the formula (VII)

(VII)

wherein $R^1$, $R^4$, m and n are as defined above, with an isocyanate compound containing a haloethyl group of the formula (VIII):

(VIII)

wherein Y represents a halogen atom; $R^3$ is hydrogen or a methyl group; A is a direct bond,

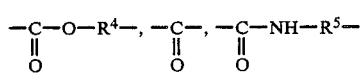

or a substituted or unsubstituted phenylene; $R^4$ and $R^5$ each represents an alkylene, to obtain a compound of the formula (IX):

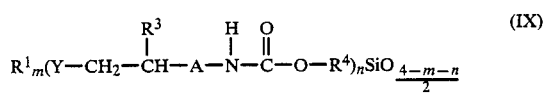
(IX)

in which $R^1$, $R^4$, $R^3$, m, n, Y and A are as defined above, and of reacting the abovementioned compound (IX) with a dehydrohalogenation agent. Examples of the isocyanate compounds of the formula (IV) are α-chloromethyl propionyl isocyanate, β-chloropropionyl isocyanate, and the like, and examples of dehydrohalogenation agents are, for example, sodium hydroxide, potassium hydroxide, sodium alkoxide potassium, alkoxide, alkali carbonate, pyridine, dialkyl amines, trialkyl amines as triethyl amine and the like.

Since the both reactions of Step 1 and Step 2 proceed very effectively and quickly, this alternative method is also quite useful for the production of the present polymerizable monomers containing silicons. Though the polymerizable monomers containing silicons used in the present invention are most conveniently expressed by means of the aforesaid rational formula (V), the particularly useful members shall be given below by using the structural formula, respectively.

cyclic siloxane monomers

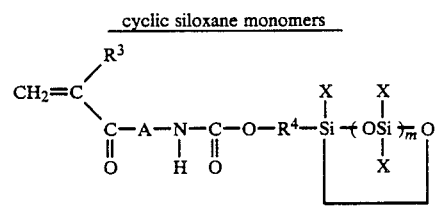

wherein X is

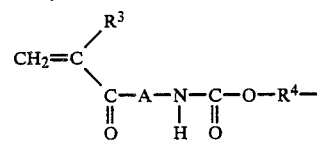

or a monovalent hydrocarbon residue; $R^3$, $R^4$ and A are as defined hereinbefore; m is an integer of 2 and more.

linear (non-cyclic) siloxane monomers

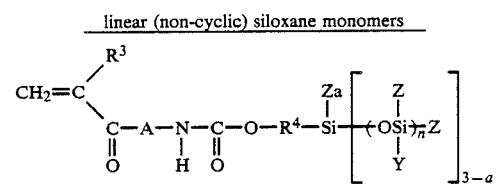

wherein $R^3$, $R^4$ and A are as defined above; Y represents

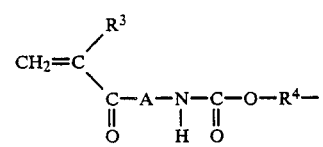

or a monovalent hydrocarbon residue; Z is a monovalent hydrocarbon residue; a is 1 or 2 and n is an integer of 1 and more.

monomers containing silicon atoms

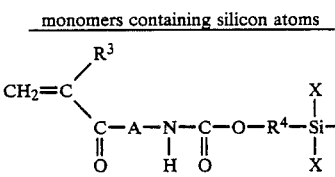

wherein $R^3$, $R^4$, and A are as defined above, and X is a monovalent hydrocarbon residue or

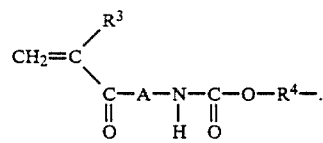

As the α,β-ethylenically unsaturated monomers to be additionally polymerized with said silicon containing polymerizable monomers in the invention, any of the members customarily used in the preparation of vinyl resins may be satisfactorily used. They may be either mono functional or poly functional compounds.

Examples of mono functional monomers are methyl acrylate, methyl methacrylate, ethyl acrylate, ethyl methacrylate, n-propyl acrylate, n-propyl methacrylate, n-butyl acrylate, n-butyl methacrylate, iso-butyl acrylate, iso-butyl methacrylate, t-butyl acrylate, t-butyl methacrylate, 2-ethyl hexyl acrylate, 2-ethyl hexyl methacrylate, isononyl acrylate, isononyl methacrylate, lauryl acrylate, lauryl methacrylate, acrylic acid, methacrylic acid, 2-hydroxy ethyl acrylate, 2-hydroxy ethyl methacrylate, tri-butyl tin acrylate, tri-butyl tin methacrylate, acrylamide, N-butoxymethyl acrylamide, 2-methoxyethyl acrylate, 2-ethoxyethyl acrylate, 2-butoxyethyl acrylate, acid phosphoxy ethyl methacrylate, 3-chloro-2-acid phosphoxy propyl methacrylate, acid phosphoxy propyl methacrylate, ethyleneglycol mono acrylate, ethyleneglycol mono methacrylate, 2-isocyanate ethyl methacrylate, methacryloyl isocyanate and other acrylic or methacrylic monomers; styrene, vinyl toluene, dibutyl fumarate, diethyl fumarate, N-vinyl pyrolidone and other non-acrylic monomers. Examples of polyfunctional monomers are ethyleneglycol diacrylate, ethyleneglycol dimethacrylate, diethyleneglycol diacrylate, diethyleneglycol dimethacrylate, triethyleneglycol diacrylate, triethyleneglycol dimethacrylate, 1,3-butyleneglycol diacrylate, 1,3-butyleneglycol dimethacrylate, 1,4-butyleneglycol diacrylate, 1,4-butyleneglycol dimethacrylate, 1,6-hexaneglycol diacrylate, 1,6-hexaneglycol dimethacrylate and the like.

The polymerization of said polymerizable monomer (V) and at least one other polymerizable vinyl monomer abovementioned may be carried out, following a conventional addition polymerization technique, in the presence of an appropriate polymerization initiator as azobis series compounds and in an appropriate reaction medium, and no specific means are required.

The present vinyl polymers may also be advantageously prepared by the combination steps of effecting an addition polymerization of a polymerizable isocyanate compound (VI):

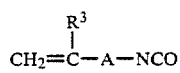

with at least one other α,β-ethylenically unsaturated monomer bearing no functional group reactive to said isocyanate group, e.g. hydroxyl, amino and the like, and reacting thus obtained product with an organosilicon compound containing hydroxyl groups of the formula (VIII). In either method, a novel vinyl polymer containing silicons having in its molecule at least one constituent unit of the formula (I):

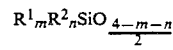

in which $R^1$ is a substituted or unsubstituted monovalent hydrocarbon residue;

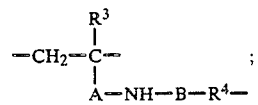

$R^3$ is hydrogen or methyl group; $R^4$ is a substituent directly bonded to silicon atom and is selected from a substituted or unsubstituted alkylene, or a substituted or unsubstituted alkylene containing hetero atoms; m and n each is a positive integer which will fulfil the requirement of $2 \leq m+n \leq 4$; A is a direct bond,

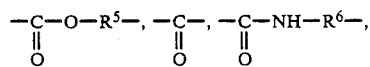

phenylene or a substituted phenylene; B is

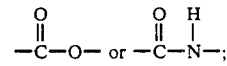

$R^5$ and $R^6$ each represents an alkylene, providing that when A is

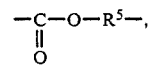

m+n is 2, of the present invention can be easily prepared. By the selection of particular polymerizable monomer used, the present vinyl polymer may contain in its molecule at least one constituent unit of either one of the following:

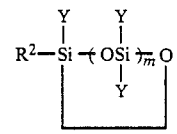

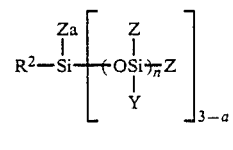

or

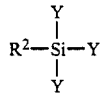

wherein Y is $R^2$ or a monovalent hydrocarbon residue; Z is a monovalent hydrocarbon residue; m is an integer of 2 to 4; n is an integer of 1 and more; a is 1 or 2; and $R^2$ has the same meaning as defined hereinbefore. The present methods are quite suitable for the industrial scale production of the present vinyl polymers because the required materials are easily available or prepared as desired and reaction speed and the reaction yield are excellent in each reaction step involved.

Furthermore, the present vinyl polymers thus obtained have unique combination of the properties of excellent water resistance, weather resistance, oxygen permeability or the like derived from the presence of siloxane-silicon bonding, excellent adhesion towards various substrate materials due to the presence of urethane bonding, and desired properties resulting from the exaggerated cohesive power. Therefore, the present vinyl polymers are quite useful in various technical fields including lens and other molding products, paints and various instrial resins.

The invention shall be now more fully explained in the following examples. Unless otherwise being stated, all parts and % are by weight.

MANUFACTURING EXAMPLE 1

Into a 4-necked flask fitted with a stirrer, a reflux condenser and a dropping funnel, were placed 424 parts of 1,3,5,7-tetramethyl-3,5,7-tripropyl-1-(γ-hydroxypropyl) cyclotetrasiloxane and 60 parts of butyl acetate and the mixture was maintained at 20°–25° C. To this, were dropwise added 111 parts of methacryloyl isocyanate at a constant speed in 30 minutes and after completion of said addition, the mixture was maintained at a room temperature for 3 hours and then stirred at 50° C. under 5 mmHg pressure for 1 hour to remove butyl acetate out of the system. The thus obtained product was confirmed to be of the structure A:

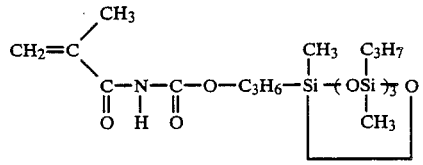

as determined by infra-red spectrum analysis and mass spectrum analysis thereof, and was a slightly viscous, clear liquid; the purity determined by quantitative analysis by gas chromatography means 98.8%; refractive index $n_D^{25} = 1.454$; and the viscosity 180 cp.

MANUFACTURING EXAMPLE 2

Into a similar reaction vessel as used in Example 1, were placed 280 parts of bis (trimethylsiloxy)-methyl-3-hydroxypropyl silane and maintained at 20°–25° C. To this, were dropwise added 111 parts of methacryloyl isocyanate in 30 minutes at a constant speed under oxygen stream and the mixture was then maintained at 20°–25° C. for 1 hour to obtain the reaction product, which was confirmed by infra-red spectrum analysis to be a silicon-containing polymerizable monomer of the formula (B):

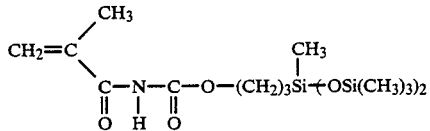

The product was a slightly viscous, clear liquid; the purity confirmed by gas chromatography 98.5%; and the viscosity 450 cp.

MANUFACTURING EXAMPLE 3

Into a similar reaction vessel as used in Manufacturing Example 1, were placed 424 parts of 1,3,5,7-tetramethyl-3,5,7-tripropyl-1-(γ-hydroxypropyl) cyclotetra siloxane, 0.5 part of dibutyl tin dilaurate and 100 parts of xylene and the mixture was maintained at 80°–85° C. To this, was dropwise added under oxygen stream and at a constant speed a mixture of 155 parts of methacrylic acid 2-isocyanate ethyl and 0.06 part of 2,6-dimethyl-4-methyl phenol in 30 minutes and the mixture was maintained at 80°–85° C. for 1 hour and then stirred at 50° C. under 5 mmHg pressure for 1 hour to remove the xylene.

The thus-obtained product was confirmed by infrared spectrum analysis to be a polymerizable monomer (C) of the following formula:

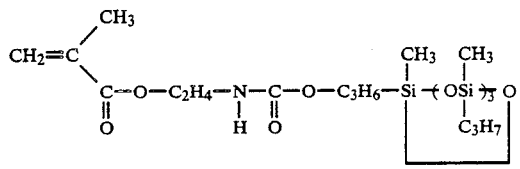

and was a slightly viscous, clear liquid; the purity confirmed by gas chromatography 99.1%; the refractiave index $n_d^{25} = 1.4424$; and the viscosity 200 cp.

EXAMPLE 1

Into a reaction vessel fitted with a stirrer, a thermometer, a reflux condenser, a nitrogen gas inlet tube and a dropping funnel, were placed 100 parts of xylene and 40 parts of the polymerizable monomer (A) obtained in Manufacturing Example 1, and the mixture was heated, under $N_2$ stream, to 90° C. To this, a mixture (a) of 100 parts of methyl methacrylate, 60 parts of n-butyl acrylate and 3.0 parts of 2,2'-azobisisobutyronitrile was dropwise added from a dropping funnel at a constant speed in 3 hours. After completion of said addition, the combined mixture was maintained at 90° C. for 30 minutes and then added dropwise with a mixture of 1 part of t-butyl peroxy-2-ethyl hexanoate and 10 parts of xylene.

Thereafter, the mixture was maintained at 90° C. for 5 hours to obtain a resinous solution (I).

Using a benzene-methanol purification method, a sample of a purified polymer was obtained from said resinous solution (I) and subjected to $^1$H-NMR analysis. The monomer composition was as follows:
polymerizable monomer containing silicons (A) : methyl
methacrylate : n-butyl acrylate = 18.4:52.8:28.8 (weight % calculation).

Molecular weight of said polymer was analyzed by GPC means, and the result was as follows:
number average molecular weight 10100
weight average molecular weight 59300

EXAMPLE 2

Into a similar reaction vessel as used in Example 1, were placed 100 parts of xylene and 10 parts of methacryloyl isocyanate and the mixture was heated under N2 stream to 90° C. To this, a mixture (b) of 60 parts of methyl methacrylate, 30 parts of n-butyl acrylate and 1.5 parts of 2,2'-azobisisobutyronitrile was dropwise added from a dropping funnel in 3 hours and the combined mixture was then maintained at 90° C. for 5 hours. Thereafter, 76.4 parts of 1,3,5,7-tetramethyl-3,5,7-tripropyl-1-(γ-hydroxypropyl) cyclotetrasiloxane were added dropwise in 1 hour and the combined mixture was maintained at a room temperature for 2 hours. The IR spectrum showed no presence of isocyanate groups in the reaction mixture.

From a part of thus obtained resinous solution (II), purified polymer was recovered and analyzed as in Example 1.

Monomer composition:
polymerizable monomer containing silicon, methyl methacrylate: n-butyl acrylate=32.3:45.1:22.6 (weight % calculation)
number average molecular weight 13600
weight average molecular weight 88700

EXAMPLE 3

Into a test tube, were placed 50 g of polymerizable monomer containing silicon containing compound (A) obtained in Manufacturing Example 1, 25g of methyl methacrylate, 10 g of ethyleneglycol monomethacrylate, 5g of ethyleneglycol dimethacrylate, 10 g of ethyl methacrylate and 0.1g of azobisisobutyronitrile and after purging the air with nitrogen gas, the tube was sealed. The content was polymerized by UV irradiation at 40° C. for 18 hours and then by heating at 110° C. for 6 hours to obtain a colorless, solid stick, vinyl polymer containing silicon.

EXAMPLE 4

Into a similar reaction vessel as used in Example 1, was placed 100 parts of xylene and the content was, while introducing N$_2$ gas, heated to 90° C. To this, the following mixture (c) was dropwise added in 4 hours.
polymerizable monomer containing silicons (B) obtained in Manufacturing Example 2 60 parts
methyl methacrylate 100
2-ethyl hexyl acrylate 40
t-butylperoxy-2-hexanoate 3
After completion of said addition, the mixture was maintained at 90° C. for 30 minutes and treated as in Example 1 to obtain a resinous solution (III). The contained polymer was purified and analyzed as in Example 1.

Monomer composition:
polymerizable monomer containing silicon (B) : methyl methacrylate: 2-ethyl hexyl acrylate=28.5:51.8:19.7 (weight % calculation)
number average molecular weight 15700
weight average molecular weight 98900

EXAMPLE 5

Into a similar reaction vessel as used in Example 1, were placed 100 parts of xylene and the content was, while introducing N$_2$ gas, heated to 90° C. To this, the following mixture (d) was dropwise added in 3 hours.
Mixture (d):
polymerizable monomer containing silicon (C) obtained in Manufacturing Example 3 60 parts
methyl methacrylate 100
butyl acrylate 40
2,2'-azobisisobutyronitrile 3.0
After completion of said addition, the combined mixture was maintained at 90° C. for 30 minutes and thereafter treated in the same way as in Example 1 to obtain a resinous solution (IV). The contained polymer was purified and analyzed as in Example 1. The results are as follows:

polymerizable monomer containing silicon (C): methyl: methacrylate: butyl acrylate=27.9:52.1:20.0 (weight % calculation)
number average molecular weight 11000
weight average molecular weight 58700.

What is claimed is:

1. A silicon-containing vinyl polymer having in its molecule the repeating unit of the formula:

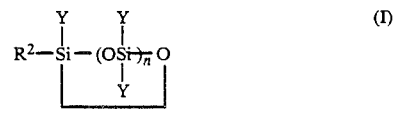

(I)

wherein
R$^2$ is

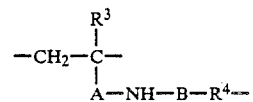

the

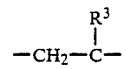

portion in the skid R$^2$ being the vinyl polymer main chain unit and the —A—NH—B—R$^4$— portion being the pendant group of said vinyl polymer main chain, A is a direct bond,

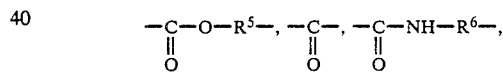

a phenylene or a substituted phenylene; B is

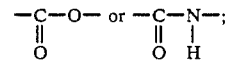

R$^5$ and R$^6$ each represents an alkylene; R$^3$ is hydrogen or methyl; R$^4$ is a substituted or unsubstituted alkylene directly bonded to a silicon atom; Y is R$^2$ or a C$_1$ to C$_6$ alkyl or alkenyl; and n is a positive integer of at least 2, and the repeating unit of at least one other α,β-ethylenically unsaturated monomer.

2. A silicon containing vinyl polymer having in its molecule the repeating unit of the formula:

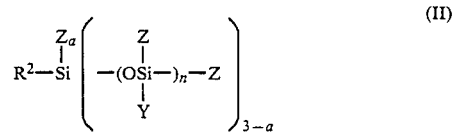

(II)

wherein
R$^2$ is

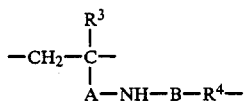

the

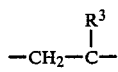

portion in the said R² being the vinyl polymer main chain unit and the —A—NH—B—R⁴— portion being the pendant group of said vinyl polymer main chain, A is a direct bond,

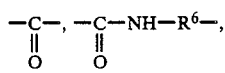

a phenylene or a substituted phenylene: B is

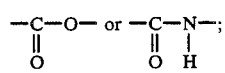

R⁶ each represents an alkylene; R³ is hydrogen or methyl; R⁴ is a substituted or unsubstituted alkylene directly bonded to a silicon atom; Y is R² or $C_1$-$C_6$ alkyl or alkenyl; Z is $C_1$-$C_6$ alkyl or alkenyl; a is 1 or 2 and n is a positive integer of at least 1, and the repeating unit of at least one other α,β-ethylenically unsaturated monomer.

3. A silicon-containing vinyl polymer having in its molecule the repeating unit of the formula:

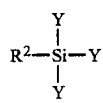

wherein R² is

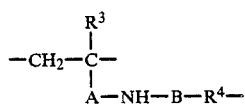

the

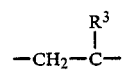

portion in the said R² being the vinyl polymer main chain unit and the —A—NH—B—R⁴— portion being the pendant group of said vinyl polymer main chain, A is a direct bond,

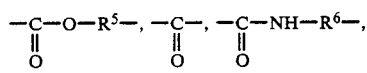

a phenylene or a substituted phenylene; B is

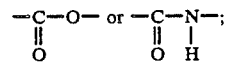

R⁵ and R⁶ each represents an alkylene; R³ is hydrogen or methyl; R⁴ is a substituted or unsubstituted alkylene directly bonded to a silicon atom; Y is R² or a $C_1$-$C_6$ alkyl or alkenyl and the repeating unit of at least one other α,β-ethylenically unsaturated monomer.

4. A process for preparing a silicon-containing vinyl polymer of claim 3, which comprises effecting an addition polymerization of a silicon-containing monomer of the formula:

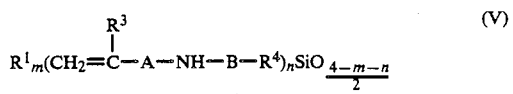

in which R1 represents $C_1$ to $C_6$ alkyl or alkenyl groups; R³ is hydrogen or methyl; A is a direct bond,

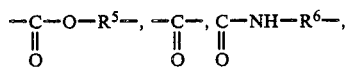

a phyenylene or a substituted phenylene; B is

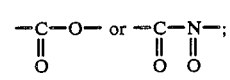

R⁵ and R⁶ each represents an alkylene; R⁴ is an alkylene directly bonded to a silicon atom; m and n each is a positive integer, which satisfies the requirements of $2 \leq m+n \leq 4$, providing that when A is

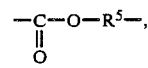

m+n is 2 and at least one α,β-ethylenically unsaturated monomer other than the above-mentioned silicon-containing monomer.

5. A process for preparing a silicon-containing vinyl polymer of claim 3, which comprises effecting an addition polymerization of a polymerizable isocyanate compound of the formula:

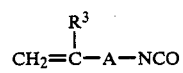

wherein R³ is hydrogen or a methyl group; A is a direct bond,

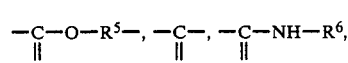

a phenylene or a substituted phenylene; R⁵ and R⁶ each represents an alkylene and at least one α,βethylenically unsubstituted monomer other than the above-mentioned polymerizable isocyanate compound, and effecting the reaction of thus obtained vinyl polymer with an organosilicon compound of the formula:

$$R^1{}_m(HO-R^4)_n SiO_{\frac{4-m-n}{2}}$$

wherein $R^1$ is a $C_1$ to $C_6$ alkyl or alkenyl group; $R^4$ is a substitutent directly bonded to a silicon atom and is selected from an alkylene or alkylene containing hetero atoms; m and n are each positive integers which fulfills the requirements of $2 \leq m+n \leq 4$, provided that when A is $$-\underset{\underset{O}{\|}}{C}-O-R^5,$$

m+n is 2.

* * * * *